United States Patent [19]

Heyring et al.

[11] Patent Number: 5,601,307
[45] Date of Patent: Feb. 11, 1997

[54] VEHICLE SUSPENSION SYSTEM

[75] Inventors: Christopher B. Heyring, Eagle Bay; Bryan J. Harries; Bradley J. Dimmock, both of Dunsborough; Raymond C. Heslewood, Busselton, all of Australia

[73] Assignee: Kinetic Limited, Dunsborough, Australia

[21] Appl. No.: 624,638

[22] PCT Filed: Oct. 24, 1994

[86] PCT No.: PCT/AU94/00646

§ 371 Date: Apr. 9, 1996

§ 102(e) Date: Apr. 9, 1996

[87] PCT Pub. No.: WO95/11813

PCT Pub. Date: May 4, 1995

[30] Foreign Application Priority Data

Oct. 26, 1993 [AU] Australia .................. PM 2012
Feb. 25, 1994 [AU] Australia .................. PM 4092
Jun. 1, 1994 [AU] Australia .................. PM 6044

[51] Int. Cl.$^6$ .................................. B60G 11/26
[52] U.S. Cl. ................. 280/707; 280/6.11; 280/702; 364/424.046
[58] Field of Search .................. 280/707, 6.1, 6.11, 280/6.12, 702, 709, 772, 704, DIG. 1; 180/41; 364/424.05

[56] References Cited

U.S. PATENT DOCUMENTS 2,869,892  1/1959  Sahagian .
3,884,486  5/1975  Ito et al. .
5,037,128  8/1991  Okayama et al. ............ 280/703
5,090,726  2/1992  Nakamura ................... 280/707
5,217,246  6/1993  Williams et al. ............. 280/707
5,258,913 11/1993  Baldauf ...................... 364/424.05
5,269,556 12/1993  Heyring ...................... 280/6.12
5,322,321  6/1994  Yopp ........................... 280/6.1 X
5,367,459 11/1994  Shtarkman et al. .......... 364/424.05
5,377,107 12/1994  Shimizu et al. ............. 364/424.05
5,430,648  7/1995  Sasaki ......................... 280/707 X
5,447,332  9/1995  Heyring ...................... 280/772

FOREIGN PATENT DOCUMENTS 0035330   2/1981  European Pat. Off. .
2-009062  11/1978  United Kingdom .
93-01948   2/1993  WIPO .
93-19945  10/1993  WIPO .

Primary Examiner—Christopher P. Ellis
Attorney, Agent, or Firm—Birch, Stewart, Kolasch & Birch, LLP

[57] ABSTRACT

A suspension system for a wheeled vehicle including a double acting ram (13, 14, 17, 18) connecting respective wheels to the vehicle body. Each ram has an upper and a lower chamber, a conduit (8, 8a, 10, 10a) individually connecting the upper chamber of a respective ram with the lower chamber of the diagonally opposite ram. Load unit (40) is connected between conduits (8, 8a, 10, 10a) to substantially equalize pressure therebetween and consequently loadings between wheels. A sensor (364) indicates the height of each pair of diagonally opposite wheels. A control unit (68) receives signals from wheel height sensors (360, 361, 362, 363) and sensor (364) to control valves (67) which adjust the quantity of fluid in the rams and the conduits to facilitate optimum position and load equalization for each of the wheels.

16 Claims, 5 Drawing Sheets

VEHICLE SUSPENSION SYSTEM

BACKGROUND OF THE INVENTION

This invention relates to improvements in the suspension system for a vehicle, and is specifically related to controlling the disposition of the vehicle body relative to the vehicle wheels when the vehicle is subject to load distribution variation.

In recent times there has been a trend towards resilient sprung suspension systems incorporating variable damping and spring rates in an attempt to improve vehicle stability and reduce movement of the vehicle body relative to the surface being traversed. Some more advanced suspension systems, commonly referred to as active and semi-active suspensions, incorporate a number of electronic sensors which monitor information such as vertical wheel travel and body roll, as well as speed, acceleration, steering and braking commands. This and other data is processed by a computer which instructs hydraulic or pneumatic actuators to override the normal function of resilient springs in order to interpret, compensate and adjust the suspension's performance to suit speed, terrain and other factors in order to maintain a level ride and controlled distribution of weight onto all wheels. These suspension systems require an external intelligent back-up system, and call for substantial input of external energy, drawn from the vehicle engine, to operate the actuators that affect the adjustment to the suspension system.

A range of constructions of 'active' and 'semi-active' suspensions for vehicles have been proposed including systems operating on the basis of compression and/or displacement of fluids and such systems currently in use incorporate a pump to maintain the working fluid at the required pressure and effect the high speed distribution thereof, and sophisticated control mechanisms to regulate the operation of the suspension system in accordance with sensed road and/or vehicle operating conditions. These known systems incorporating pumps and electronic control systems, which are both required to operate substantially continuously while the vehicle is in operation, are comparatively expensive to construct and maintain, and require energy input, and therefore have limited acceptability in the vehicle industry.

There is disclosed in Australian Patent Application No. 65015/90, a vehicle having a load support body, and a pair of front ground engaging wheels and a pair of rear ground engaging wheels connected to the body to support same, and wherein each wheel is displaceable relative to the body in a generally vertical direction. Interconnected between each wheel and the body is a fluid ram including first and second fluid filled chambers that vary in volume in response to vertical movement between the respective wheels and the body.

The first chambers of the front and rear wheels on each side of the vehicle are in communication by respective individual first fluid circuits. Similarly the second chambers of the front wheels and of the rear wheels are in communication by respective individual second fluid circuits. This construction provides, when the vehicle is in use, substantially the same fluid pressure in the two chambers of any individual fluid circuit thereby inducing all wheels to maintain tractive ground engagement. In practice at least one and preferably each of said individual fluid circuits include at least one pressure accumulator, and preferably also a damping device operable to at least partially dissipate pressure shock in the fluid circuit or circuits.

The vehicle suspension above described differs greatly from all the known systems in that the wheel travel is not dependent upon progressive resilient suspension mechanisms which require variable reactions to the many ever changing conditions experienced by the vehicle. This allows free vertical travel of the individual wheels with respect to the vehicle body or chassis without having to first overcome the resistance of the conventional springing mechanisms normally incorporated between the wheels and the vehicle body. Thus, the wheels are individually unrestrained and free to move to follow the undulations of the surface being travelled without continually changing the vehicle weight distribution between the individual wheels. This reduction or elimination of changes in weight distribution significantly improves the traction between the wheels and the surface being traversed and the handling characteristics of the vehicle.

A further development of the above described suspension system is disclosed in Australian Patent Application No. 23664/92. In that suspension system a front wheel ram and the diagonally opposite rear wheel ram have the upper chamber of the front ram interconnected with the lower chamber of the rear ram and the lower chamber of the front ram interconnected to the upper chamber of the rear ram. Similarly the respective chambers of the other front ram and rear ram are likewise interconnected. There is thus provided two individual fluid circuits, each comprising a front ram and a diagonally opposite rear ram. Each of the conduits interconnecting the respective upper and lower chambers has a conventional pressure accumulator in communication therewith. The two circuits are interconnected to the load distribution unit arranged to maintain equi-pressure in the two circuits as is described in detail in the previously referred to Australian Patent Application No. 23664/92.

As most vehicles are non-symmetrically loaded for a large portion of the operating time thereof such that loads carried are located so the rear wheels carry more weight than the front wheels, or the load is closer to one side than the other, thus causing the vehicle body to tilt towards the heavier side or end.

SUMMARY OF THE INVENTION

It is therefore the object of this invention to provide a vehicle suspension system which determines changes in the vehicular height and inclination and adjusts the fluid in appropriate circuits to reinstate or rectify the optimum relative heights.

With this object in view, there is provided a vehicle suspension system for a vehicle body supported by a plurality of wheels arranged in lateral and longitudinal spaced relation to the vehicle body, including individual fluid ram means arranged between each wheel and the vehicle body, each fluid ram means including a double acting ram having an upper and lower chamber, conduit means individually communicating the upper chamber of the respective rams with the lower chamber of the respective diagonally opposite ram to provide fluid circuits therebetween, a load distribution means operably interposed between the fluid circuits and adapted to at least substantially equalise the pressure in said fluid circuits and thereby maintain substantially consistent loading on all the wheels during non-dynamic wheel movement independent of the vertical disposition of the wheel, the load distribution means having a body supporting at least one displaceable member, the displacement of said displaceable member being a function of the average height of each pair of diagonally opposite wheels, sensor means adapted to generate a signal indicative of the positional relation of each of the wheels relative to the vehicle body, control means arranged to receive said signals and determine the average height of the vehicle body relative to selected pairs of orthogonally adjacent wheels at a selected location between the respective pair of orthogonally adjacent wheels, and adjustment means operable in response to variation of said determined average heights from a respective preset datum height for each said pair of wheels to adjust the quantity of fluid in said circuits communicating with the rams of said orthogonally adjacent wheels to establish said preset datum height between the orthogonally adjacent wheels and the vehicle body at said selected locations, wherein a further sensor means is provided for generating a signal indicative of the positional relation of the at least one displaceable member relative to the body of the load distribution means, the control means being adapted to receive the signal from the further sensor means and to determine and compare the said average height of each pair of diagonally opposite wheels with the position of the displaceable member, the adjustment means adjusting the quantity of fluid in the fluid circuits to return the position of the displaceable member to an optimum position to facilitate the operation of the load distribution means.

Preferably the control means is adapted to receive said signals from each said sensor means, and to independently compare the average height of each orthogonally adjacent wheel with the preset datum height of said two wheels. This determination is made in respect of each pair of orthogonally adjacent wheels in sequence, such as front left—front right; rear left—rear right; and then front left—rear left; front right—rear right; and the adjustments are made in a corresponding sequence. This process is repeated until the height of the vehicle body relative to the wheels is at the required respective datum height. The adjustment means is preferably arranged to operate to individually adjust the volume of fluid in the respective fluid circuits connecting the diagonally opposite front and rear wheels to provide the required positional location of the body relative to the wheels.

Conveniently, a said respective sensor means is provided to sense the position of each wheel relative to the vehicle body and provide an input to the control means indicative of that positional relationship. The control means determines from the individual inputs from the sensor means, the average height of the vehicle body between each two orthogonally adjacent wheels and compares this average height with the relevant preset datum height. The preset datum height may be adjustable. For example, the datum height can be adjusted manually or by the control means in dependence on the operational status of the vehicle.

The body of the load distribution means preferably includes at least two chambers, each chamber supporting a said displaceable member in the form of a piston rod carrying a piston separating the chamber into inner and outer minor chambers, the minor chambers being in fluid communication with opposing said fluid circuits, whereby any pressure differential between the fluid in the minor chambers results in displacement of the piston rod.

The piston rods of each chamber may be operably interconnected to transfer force therebetween. Alternatively, the piston rods may be separately movable, a separate said further sensor means may be provided for each said piston rod to enable the control means to determine the relative position of each piston rod, the outer minor chambers of each chamber may be in fluid communication to enable the adjustment means to adjust the fluid within each said outer minor chamber to thereby control the relative position of the piston rods.

The adjustment means may include pump means and valve means under the control of the control means, for example an ECU, to supply or withdraw fluid from selected fluid circuits to effect the necessary adjustment to the position of the wheels relative to the vehicle body to achieve the necessary correct average height corresponding to the relevant datum height.

Pressure transducers may be located on at least one of the conduit means and between the pump means and the valve means for providing signals to the control means to thereby prevent any unnecessarily high pressure in the system. This can arise when the vehicle is adjusted for a fully laden vehicle, but the vehicle is actually unladen.

Suspension systems of the general type to which the present invention applies employing fluid actuated rams, conveniently provide in each fluid circuit a pressure accumulator to establish a degree of resilience within the fluid circuit, and hence in the suspension system. Accordingly, as the total weight of the vehicle varies, such as, as a result of adding or removing people or load from the vehicle body, the pressure in the fluid circuits will vary resulting in a variation in the volume of fluid in the accumulator as a consequence of compression of the gas in the accumulator.

Thus, the quantity of the fluid in the accumulator may vary with variations in operating conditions thus, resulting in a variation in the actual amount of fluid in the circuit, excluding the amount of fluid in the accumulator, resulting in a lowering of the body with respect to the wheels. This will result in the signals from the sensor means communicating to the control means a lowering of the average height of the one end and or side of the vehicle body. When such conditions are detected by the control means, the latter initiates operation of the pump means and actuate the appropriate valve means to supply further fluid to that circuit to return the vehicle body to its selected normal operating height. Upon subsequent removal of the additional load, the resulting reduction in pressure in the fluid system will result in the return of fluid from the accumulator to the fluid circuit and necessitate the draining of fluid from the circuit to a reservoir to again establish the nominal correct height of the vehicle body with respect to the wheels. The above discussed departure of the vehicle height from the selected datum can also arise from leakage of fluid from one or more of the fluid circuits, and can be corrected is the manner as above described.

The control means may preferably include a plurality of operational modes, providing differing rates of adjustment in dependence on the variance of the attitude of the vehicle from the preset datum height and the operational status of the vehicle, for example whether the vehicle is in use or is parked. The operational modes may, for example, include "initial set up", "intermediate" and "fine" adjustment cycles whilst the vehicle is in use and a "sleep" mode when it is parked.

Lock out valve means may preferably be located in at least one of the conduit means for selectively preventing flow of fluid therethrough. This "locks out" the resilience in the system or completely prevents ram movement which is desirable under certain circumstances, for example when the handbrake is applied.

It will be convenient to further describe the invention by reference to the accompanying drawings which illustrates possible embodiments of the invention. Other embodiments of the invention are possible and consequently the particularity of the accompanying drawings is not to be understood as superseding the generality of the preceding description of the invention.

DETAILED DESCRIPTION

Figure 1:
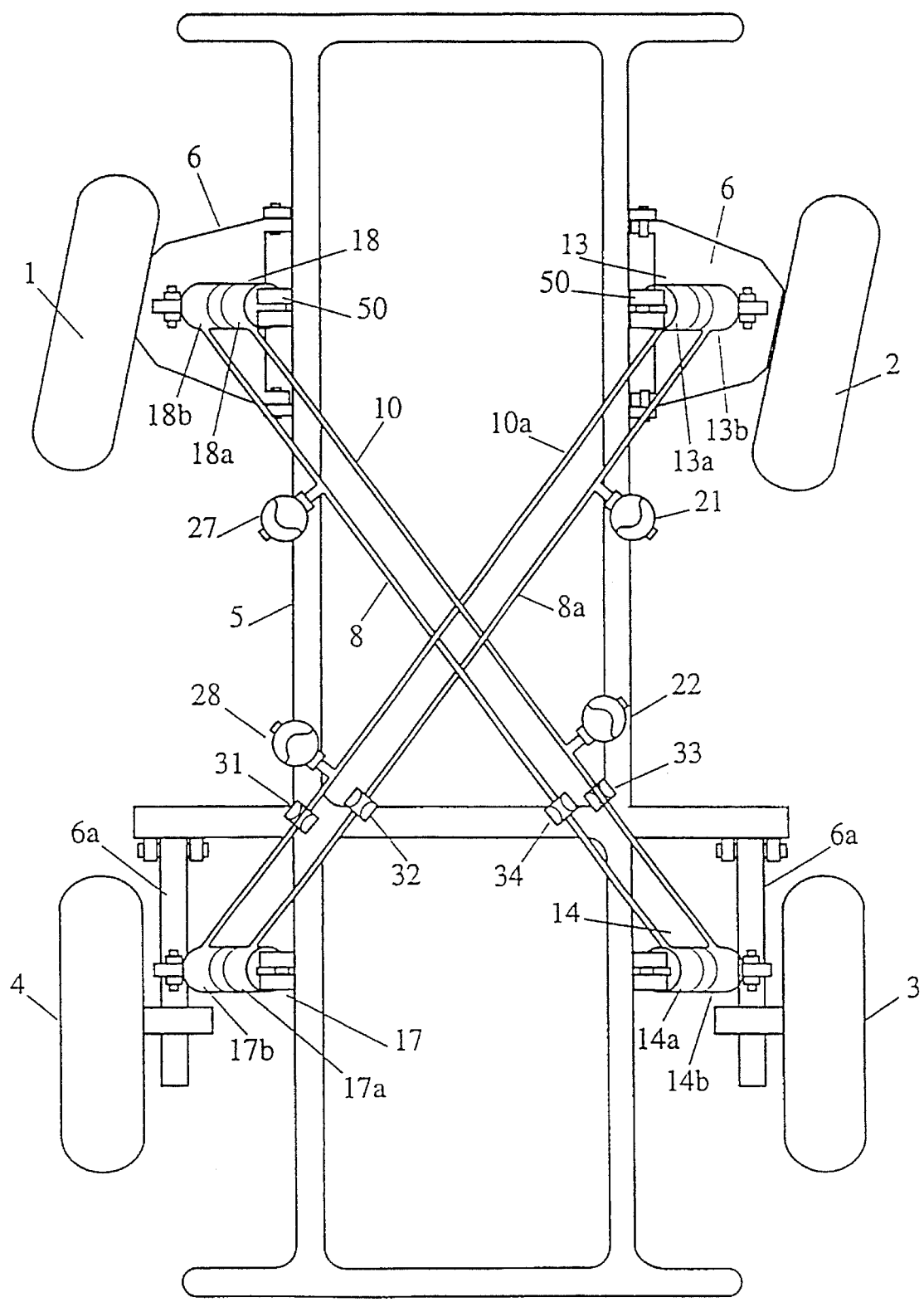
FIG. 1 is a diagrammatic layout of a vehicle chassis and wheel assembly incorporating the basic suspension system to which the present invention is applicable.
Figure 2:
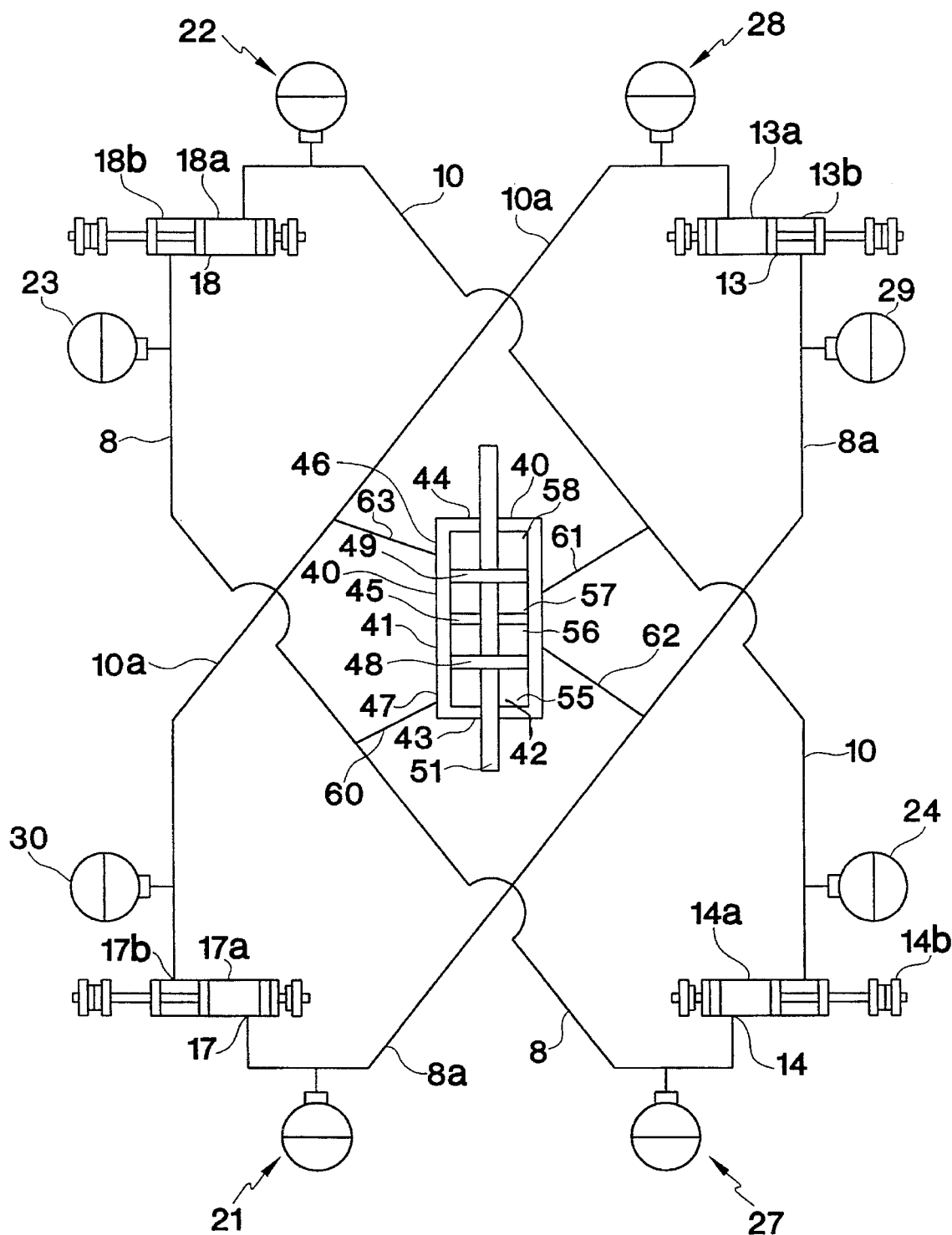
FIG. 2 is a fluid circuit diagram of the suspension system shown in FIG. 1 incorporating a load distribution unit.

FIGS. 1 and 2 shows the suspension system discussed in Australian patent application No. 23664/92, details of which are incorporated herein by reference. Referring initially to FIG. 1, the vehicle chassis 5, is supported by four wheels 1 to 4 respectively through parallel wishbone type linkage 6, for front wheels 1 and 2 and trailing arms 6a for rear wheels 3 and 4, the construction of each being well known. Other known forms of linkage for connecting vehicle wheels to a chassis could be used if preferred. It is however to be noted that no springs, torsion bars, roll or stabiliser bars or other resilient mechanical suspension elements are necessary between the chassis and the respective wheels.

A respective double acting ram is interconnected between the chassis 5 and the linkages 6 and 6a connecting each wheel to the chassis 5. The front and rear rams on the left side in FIG. 1 are numbered 18 and 17 respectively and on the right side 14 and 13 respectively. Each of the rams have a cylinder coupled as at 50 to the chassis 5 and a piston therein dividing the cylinder into two chambers indicated as 17a and 17b in respect of cylinder 17 and 18a and 18b in respect of ram 18. The other two cylinders 13 and 14 are of the same construction and are similarly identified. The piston of each ram is connected to the respective wheel through the linkage 6 so the piston will reciprocate in the cylinder in response to movement in the general vertical direction of the wheel relative to the chassis 5.

The diagonally opposite rams 18 and 14 have the upper chamber 18a and lower chamber 14b in communication by the conduit 10, and lower chamber 18b and upper chamber 14a in communication by the conduit 8. Similarly the upper and lower chambers of the rams 17 and 13 are in communication, chambers 17a and 13b by the conduit 8a and chambers 17b and 13a by conduit 10a.

The conduits 8, 8a, 10 and 10a interconnecting the four double acting rams 13, 14, 17 and 18, which support the chassis 5, each has at least one pressure accumulator 27, 21, 22 and 28 in communication therewith, and are primarily responsible for providing resilience in the suspension as do springs in most prior art sprung suspensions. If the fluid used in the rams and connecting conduits is compressible, such as a gas, accumulators are not required as the compressible fluid itself provides the required level of resilience. It is preferred, as shown in FIG. 2, that additional optional accumulators 23, 24, 29 and 30 are provided in each of the conduits, 8, 10, and 8a, 10a respectively. These accumulators, when provided are preferably smaller and matched in size and close to the lower chambers of the rams thus allowing the fluid in the lower chambers to be expelled quickly and provide resistance to shock loading when the wheels may be thrust down and could damage the pistons and cylinders. The provision of accumulators in general also enable faster reactions or responses to ram movements, as frictional losses are minimised.

All accumulators preferably are located as near as practical to their associated rams to provide an immediate and accurate response to fast dynamic forces arising when the vehicle is travelling fast.

When the above described suspension is fitted to normally slow moving vehicles, such as cranes, it is appropriate to incorporate only a single accumulator in each conduit, and to locate the accumulator near to the connection of the ram to the conduit in such vehicles the accumulators may be provided with an isolating means, such as a solenoid valve, to reduce the resilience of these particular circuits when under heavy load. Additionally and conversely there can be multiple accumulators in any circuit and each accumulator may be precharged with gas to a different pressure to provide a progressive range of spring rates to suit different loading situations. The accumulators can each be provided with damping valve in the throat thereof to perform the same function as so called shock absorbers in other vehicles suspension systems.

Flow control devices such as indicated at 31, 32, 33 and 34 in FIG. 1 may be provided in any or each of the conduits to reduce the rate of the fluid flow to ensure that the rams at either end of the conduits communicate directly at a relatively slow speed, as arises when the vehicle is traversing rough ground requiring large wheel travel motions, and optimum low ground pressure on all wheels. At high speeds the small dynamic wheel travel motions are best resolved primarily by the accumulators.

Any of the conduits may be provided with flow control devices of a variable nature or other means to vary and even stop the flow along the conduits between the connected rams. An example of such a valve may be a solenoid valve controlled by an ECU which processes a variety of information from sources such as accelerometers or pressure transducers and thereby cause the sudden or gradual closure of the valves.

The above construction of the suspension system results in the movement of wheels 1 and 3, relative to the chassis 5, under the control of double acting rams 18 and 14, being in the same direction due to the arrangement of the interconnecting conduits 8 and 10. The movements are also approximately equal except for such difference as may arise from the fluid passed to the accumulator or accumulators coupled to the conduits 8 and 10. The same conditions exist in respect of the wheels 4 and 3.

The above interactions between the respective rams associated with each wheel of the vehicle effects control of roll when the vehicle is turning, particularly when turning at speed, and control of pitch when the vehicle is braking or acceleration, particularly severe braking or acceleration.

The suspension system shown in FIG. 1 is illustrated diagrammatically in FIG. 2 and in addition incorporates a load distribution unit 40 with which each of the conduits 8, 8a, 10 and 10a are in direct independent communication. The load distribution unit 40 comprises a body 41 having in one embodiment a cylindrical bore 42 closed at each end 43 and 44 and divided into two major chambers 46 and 47 by the intermediate fixed wall 45. Respective pistons 48 and 49 are provided in the major chambers 46 and 47 respectively each mounted on the common piston rod 51 which extends in sealed relation through the intermediate wall 45 and each closed ends 43 and 44 of the body 41. This arrangement results in each side of the respective pistons having the same area.

The pistons 48 and 49 and the piston rod 51 can move in the cylindrical bore 42 providing four variable volume minor chamber 55, 56, 57 and 58, with minor chambers 55 and 57 varying in the same direction in response to piston movement, and minor chambers 56 and 58 varying in the same direction but in the opposite direction to minor chamber 55 and 57 for the same piston movement. The conduits 8 and 10, forming the fluid circuit between diagonally opposite fluid rams 18 and 14, communicate with minor chamber 55 and 57 by branch conduits 60 and 61. Similarly conduits 8a and 10a, forming the fluid circuit between diagonally opposite rams 17 and 13, communicate with minor chambers 56 and 58 by branch conduits 62 and 63.

In the initial setting up of the suspension the fluid in the chambers 55, 56, 57 and 58 are adjusted so that the pistons 48 and 49 are each located substantially centrally in the respective major chambers 47 and 46 with the pressure in each chamber equal.

When operating the vehicle, if the net pressure in minor chambers 55 and 57 is greater than the net pressure in minor chambers 56 and 58 a force will exist to effect displacement of the pistons 48 and 49 upwardly as seen in FIG. 2 to achieve a balance between the respective net pressures. This in turn will displace fluid from chambers 56 and 58 into the respective conduits 8a and 10a to bring about a balanced pressure in all of the double acting fluid rams 13, 14, 17 and 18 thereby achieving substantially uniform load distribution between all four wheels 1, 2, 3 and 4, independent of the respective position of each wheel relative to the chassis 5.

This pressure balance between the fluid in the respective circuits is important to achieve when variation in wheel positions is relatively large as encountered in traversing terrain of substantial irregular surface, such as encountered in off-road vehicle operation, and where wheel movement is of relatively lower frequency but of substantial magnitude. In such operating conditions, it is most desirable to retain substantially even load distribution to all wheels in order to maintain traction and prevent bogging of the vehicle. Also in such conditions it is important to reduce lateral tilting of the vehicle to improve driver and passenger comfort, and safety from rolling over of the vehicle. The load distribution unit 40 operable as above discussed affects the necessary transfer of fluid to maintain substantial even load distribution between all four wheels and reduced chassis tilting movement.

Although the present invention is applicable directly to the suspension system disclosed in Australian application No. 23664/92 as shown in FIGS. 1 and 2, it is however also applicable to suspension systems of alternative constructions.

Figure 3:
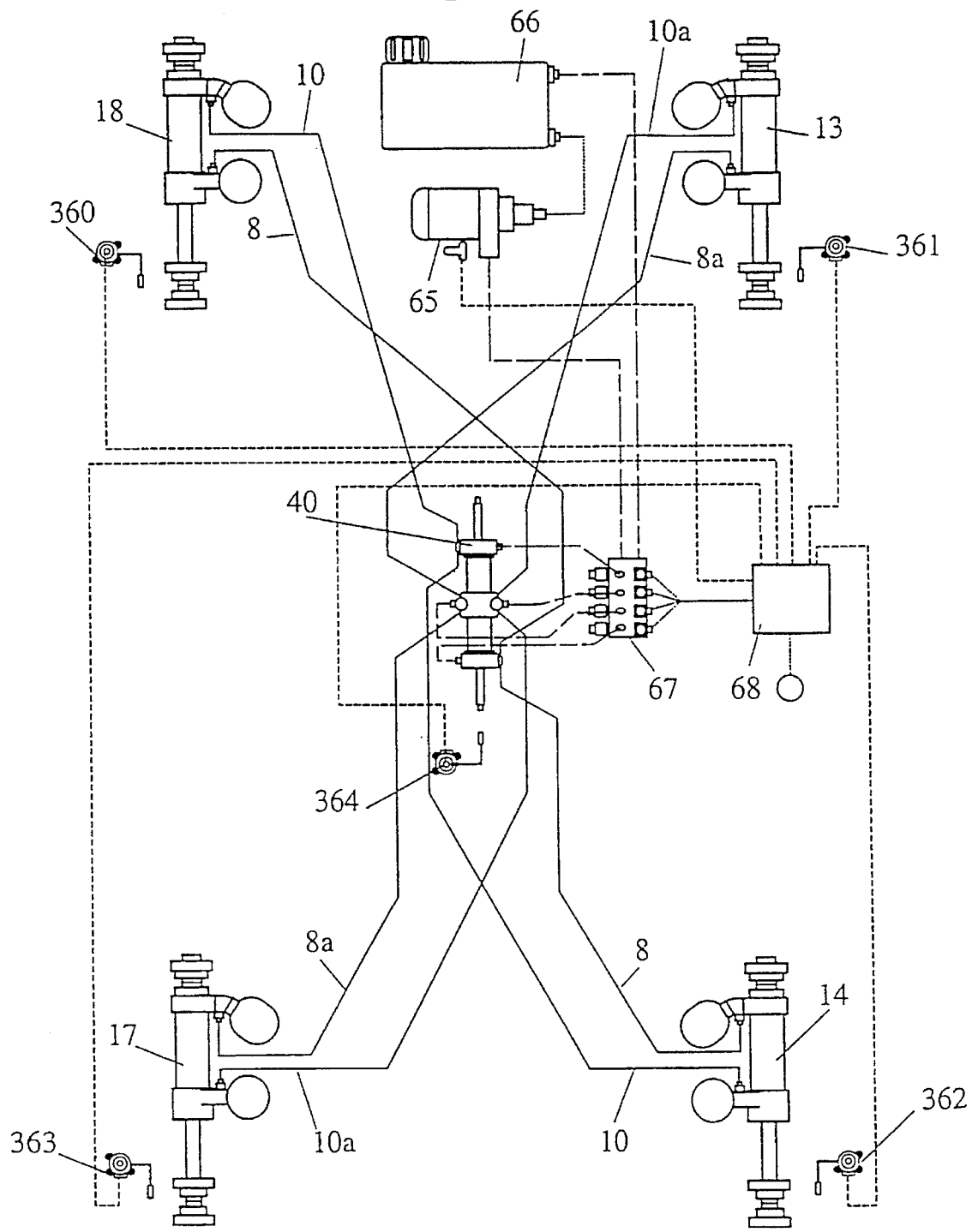
FIG. 3 is a diagram of a control system for the management of suspension system as shown in FIG. 2 by the application of the present invention.

Referring now to FIG. 3 of the drawings, there is illustrated therein the suspension system shown in and described with reference to FIGS. 1 and 2, modified to incorporate the present invention. In FIG. 3, the same reference numerals are used for components corresponding to those shown in FIGS. 1 and 2. The additional components comprise wheel position sensors 360, 361, 362 and 363 associated with wheels 1, 2, 3 and 4 respectively and arranged to generate respective signals indicative of the position of the wheel relative to the vehicle body 5. Also there is provided a centrally positioned sensor 364 to sense the position of the piston rod 51 relative to the body 41 of the load distribution unit 40. In addition there is provided a pump 65, a fluid reservoir 66, a bank of valves 67 and an electronic control unit (ECU) 68.

The bank of valves 67 control the supply of fluid by the pump 65 to the respective conduits 8, 8a, 10 and 10a and the return of fluid from the conduits to the reservoir 66. The individual valves of the valve bank 67 are controlled by the ECU 68 in response to signals from the position sensors 360, 361, 362, 363 and 364 as hereinafter described. The valves of the valve bank 67 can be activated to couple the pump 65 to any one or a number of the conduits and also one or a number of the conduits to the reservoir 66.

The ECU 68 is programmed to receive respective signals from the wheel position sensors 360, 361, 362 and 363 and determine the average height of the vehicle body 5 between selected pairs of orthogonally adjacent wheels. The average height between every pair of orthogonally adjacent wheels, that is the average height between wheels 1-2, 2-3, 3-4 and 4-1, can be determined. It is also possible to limit the determination of the average height to only between selected pairs of orthogonally adjacent wheels. The ECU 68 is further programmed to compare each determined average height with a respective pre-selected 'desired' for each wheel pair height. If the determined average height differs from the pre-selected desired average height beyond a preset tolerance, the ECU will activate the appropriate valves of the valve bank 67 to supply or remove fluid to or from the appropriate conduits to bring the average height within the allowed tolerance.

The piston rod 51 of the load distribution unit 40 should be located such that the pistons 48 and 49 are each located substantially centrally in their respective chambers 47 and 46 when the vehicle is level and on level ground. This maximises the degree of travel allowed to the pistons 48, 49 within the load distribution unit body 41. The ECU 68 is therefore programmed to maintain the piston and 51 in its central position when the vehicle is level and on level ground. However, during "articulation" of the wheels, the piston rod 51 moves away from its central position by an amount related to the degree of articulation of the wheels. Articulation of the wheels is where a pair of diagonally opposite wheels move together in the same direction and the other pair of diagonally opposite wheels move together but opposite to the previous diagonal and articulation can occur when the vehicle is travelling over or resting on an uneven surface. To ensure that sufficient clearance is maintained for movement of the pistons 48, 49 so as to allow the maximum degree of articulation for the wheels, the ECU 68 is also programmed to maintain the optimum position of the piston rod 51 relative to the degree of articulation of the wheels such that the piston rod 51 returns to its central position when the vehicle is on a level surface.

To this end, the ECU 68 is programmed to average the height of at least one pair of diagonally opposite wheels, namely wheels 1 and 3 and/or wheels 2 and 4 from the information provided by the wheel position sensors to thereby assess the degree of articulation of the wheels. The average height of each pair of diagonally opposite wheels is compared to the signal from the position sensor 64, which measures the relative position of the piston rod 51 in the load distribution unit 40 and its body 43. The ECU 68 determines the difference between the preset datum height and the average height of each pair of the diagonally opposite wheels. If the position of the piston rod 51 relative to the load distribution unit body 41 is different to the optimum position for the above determined difference, then the ECU 68 will activate the appropriate valves in the valve bank 67 to supply or remove fluid to or from the appropriate conduits until this deviation from the optimum position is corrected to within the allowed tolerance.

The combination in a control loop of any order of the above orthogonal body height adjustment and the diagonal load distribution unit adjustment will result in a vehicle levelled at the desired height with the load distribution unit in its optimum position, ensuring even load distribution to all wheels, even when the levelling is carried out on uneven ground. Should the vehicle now be placed on level ground the body will be level and the load distribution unit piston rod 51 will be centred in its stroke.

By way of example, if the average height of the vehicle body midway between the two front wheels 1 and 2 is determined by the ECU 68 to be too low, valves in the valve bank 67 are activated to pump fluid from the reservoir 66 into conduits 10 and 10*a* via the chambers 57 and 58 of the distribution unit 40 and to return fluid from conduits 8 and 8*a* to the reservoir 66. This supply of fluid to the conduits 10 and 10*a* will extend the hydraulic rams 18 and 13 respectively to thereby raise the front of the vehicle body. The supply of fluid to the conduits 10 and 10*a* is effected for a period of time determined by the ECU 68 that can be in proportion to the degree that the average front height of the vehicle is outside the allowed tolerance.

The average of each of the orthogonally opposite wheel positions, the average of the diagonally opposite wheel positions and the load distribution unit position are measured and calculated on by the ECU 68 in a control loop. In each control loop the ECU 68 activates valves in the valve bank 67 to correct the level. Due to the interrelationships of the system this may take several control loops to effect the required level. The ECU 68 loops at a speed and the valves and pump are sized to allow this levelling to be performed quickly.

The above described vehicle body height management procedure enables the controlled distribution of fluid to the rams mounted between the respective wheels and the vehicle body to maintain a predetermined height of the vehicle body relative to the wheels. It will be appreciated that the control is achieved by adding or removing fluid from the larger cross-sectional area end of each ram (the top end in the configuration as shown in the drawings) and a reverse fluid transfer from the opposite or smaller cross-sectional end of each ram being achieved by the manipulation of selected valves in the valve bank 67 under the control of the ECU 68 to supply fluid from the reservoir via the pump 65 or return fluid to the reservoir.

In the description of the vehicle height control system reference has been made to the ECU 68 comparing the average height of the vehicle between each two orthogonally adjacent wheels against a preset height stored in the ECU 68. However it will be appreciated that the desired height of the body is related to the nature of the surface being traversed, as for example in highway conditions the vehicle is preferably lower than when in off-road terrain. Accordingly, the ECU 68 is programmed with a number of preset average vehicle heights whereby the vehicle driver can select the appropriate preset height for the prevailing surface conditions. Typically, a range of 5 or 6 preset heights are provided in the program, which are manually selectable by the driver or automatically by the ECU 68.

It is desirable that adjustment to the vehicle height not be effected in response to relatively short term departures from the preset average height and it is therefore preferable to program the ECU 68 to effect corrective action only after departure from the preset average height has existed for a nominated period such as thirty seconds. This delay will normally result in height correction not being effected when the body of a vehicle rolls slightly when the vehicle is cornering.

In the preceding descriptions, specific reference has been made to hydraulic systems providing the supporting connection between the wheels and the vehicle. It is however to be understood that pneumatic or other fluid systems can equally be used within the scope of the invention as herein described.

In order for the ECU 68 to be universal in its application, it is equipped with a power supply adaptor that converts the vehicles power supply to a voltage that is acceptable to the remainder of the ECU 68. It must contain a scaling circuit for the outputs of the position sensors so they can be correctly compared, a low pass filter circuit to remove any noise from the signals, a microprocessor, with appropriate program, or discrete logic to complete the required averaging, timing and comparing functions and a driver circuit to switch the valves.

As noted previously, the ECU 68 may have a number of operational modes, being for example, while the vehicle is in use, an "initial set-up" mode, an "intermediate" mode and a "fine" mode. There may preferably be an additional "sleep" mode for when the vehicle is parked and not in use. The distinction between the various modes is that the ECU 68 alters the rate at which adjustments are made to the vehicle attitude from one mode to another. When the ECU 68 detects an input indicating a need for rapid adjustment (for example, when the vehicle is started up initially, the ECU 68 is switched to automatic from manual adjustment, or the height selector is changed) it automatically switches to its "initial set-up" mode. This mode makes continual, large adjustments to the volume of fluid in each circuit until the attitude of the vehicle is detected to be within a first wide "dead band". When the ECU 68 passes through the same program loop a number of times without making any alterations to the vehicle attitude it changes mode to "intermediate" mode. The "initial set-up" mode may only be invoked again when one of the above conditions indicating the need for rapid adjustment is satisfied. In "intermediate" mode a second, finer "dead band" is used to determine when adjustments should be made. The pulses of fluid entering and leaving the fluid circuits in "intermediate" mode may be regulated by opening the valves for a short time only. The ECU 68 may only operate in this mode for a set amount of time before reverting to its "fine" mode in which it will preferably be for the majority of the time. In this mode it may be able to make adjustments less frequently than in "intermediate" mode (for example in a ratio of 1:10), although adjustments may still be made only when the attitude of the vehicle is detected to be outside the second, finer dead band. If the attitude of the vehicle drifts to be outside the first coarse dead band the ECU may be programmed to revert to "intermediate" mode.

It should be appreciated that the individual operational modes of the ECU 68 described above could be replaced with a single, continuously variable operational mode. This mode could have variable vehicle attitude sample rates and/or variable valve opening (or pulse) lengths, for example.

The "sleep" mode is intended to ensure that the vehicle will settle with a level attitude whenever it is left parked and unused. Usually if any seal in the system is less than perfect, fluid will gradually leak from the circuit it should be in, either into another circuit or back to the tank. Over a period of time this will cause the vehicle to settle with an uneven attitude which is obviously undesirable. In order to counter this the ECU 68 may continue to monitor the attitude of the vehicle, even in "sleep" mode. This monitoring may be either continuous at an extremely slow sample rate or shod periods of faster samples. As with the other modes it is necessary to take several samples to avoid the possibility of erroneous signals misleading the ECU 68 into performing unnecessary adjustments. At set intervals the ECU 68 can then send signals to the system outlet valves to level the vehicle. Preferably adjustments may only be made when the wheel position sensors indicate that the attitude of the vehicle is outside the coarse dead band used in other modes.

Additionally, to reduce the harshness of the vehicle movement due to the pulses of fluid entering and leaving the system as adjustments are made, the ECU 68 may be used to operate the solenoid operated valves more discreetly by slowing the rate at which the valves open and close. This may be done by "ramping up" the signal or by sending extremely rapid electrical pulses to the solenoid, gradually growing in length until the valve is held fully open. A similar technique may be used in closing off the valves to smooth the change between fully open and fully closed. Alternatively the same smoothing effect may be accomplish through the use of flexible walled hose for the control lines between the valve block and the system.

One advantage of having a number of operational modes or a continuously variable operational mode is that the pump 65 and bank of valves 67 do not need to be constantly in operation and can be "rested" over certain periods thereby reducing mechanical wear of these components.

For some vehicles used in specialised applications it may be desirable to be able to "lock out" the resilience in the system or completely prevent the rams from moving. This may be accomplished by providing valves (preferably solenoid operated lock-out valves although other types of valve may be used) between the top chambers of the rams and the accumulators and/or the system conduits. These valves may preferably be operated by the ECU 68 which may activate the valves when a set of conditions are met or when a switch is depressed. To prevent the lock-out valves being actuated whilst the vehicle is in motion, the ECU 68 may be programmed to only actuate the valves when both the switch is depressed and a set of conditions have been met, for example the handbrake is applied.

The ECU 68 may also be used to control the operation of the system pump to prevent it from continually supplying an unnecessarily large head of pressure, sufficient to be able to adjust a fully laden vehicle, when the vehicle is unladen and the system pressures are lower. Preferably two pressure transducers (not shown) are provided on the vehicle, one in one of the top rear system conduits to indicate the system pressure to the ECU 68, and the other between the pump and the valve block inlet port. The ECU 68 may then operate the pump to maintain a set head of pressure above the system pressure for any variety of weight configurations.

It will be appreciated that the controller can take many forms and be programmed to receive inputs relating to other areas of the vehicle operation. However, it is to be understood that the controller does not function in a manner analogist to an active suspension. More particularly, the present invention is directed to adjusting the suspension system to correct the changes in the load and/or load distribution and not changes in the road or terrain being traversed.

Figure 4:
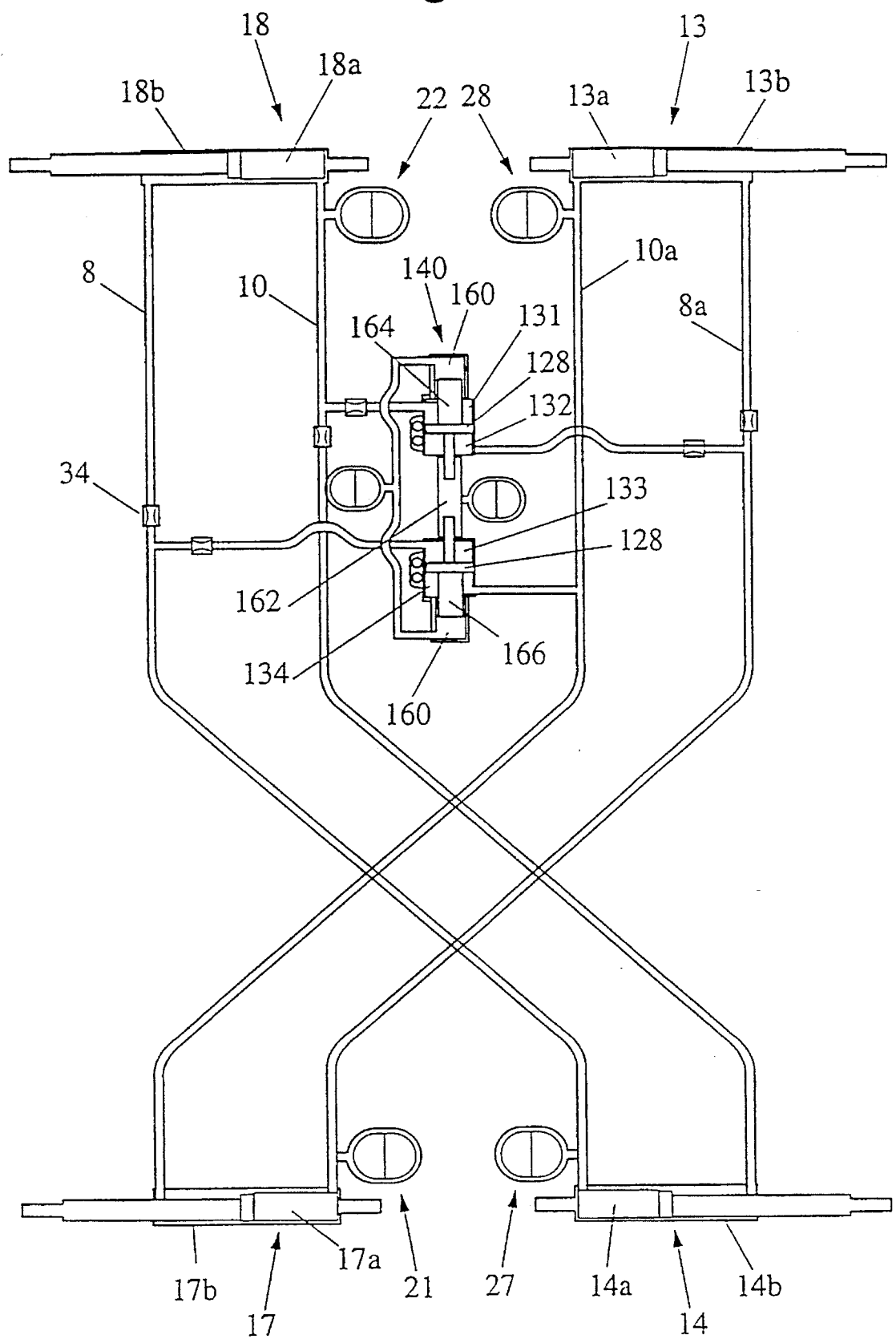
FIG. 4 is a fluid circuit diagram of the suspension system incorporating an alternative embodiment of the load distribution unit.

The above described control system can also be used in the control of a suspension system fitted with an alternative embodiment of the load distribution unit as disclosed in Australian provisional application no. PM4092. An alternative embodiment of the load distribution unit is illustrated in FIG. 4, and corresponding reference numerals are used for equivalent components of the suspension system shown in FIGS. 1 to 3. This load distribution unit 140 has the ability to control pitch and accommodate large variations in vehicle load. For example, if a significant load is added to the rear of the vehicle the pistons 128 of the load distribution unit 140 will be urged further apart due to the increased pressure in the rear chambers 132, 133 thereof. To compensate for the increased load from the rear chambers, additional fluid may be introduced into the outer chambers 160 to increase the pressure acting on the ends of the front rods 164, 166 thereby allowing the pistons 128 to return to their correct operating positions despite the increased load in the vehicle. Conversely, it may be necessary to release fluid from the outer chambers 160 to compensate for removing load from the vehicle. Therefore, for a set pressure in the centre chamber 162 (ideally achieved through the use of a pressure regulator valve) the load distribution unit 140 may be controlled to compensate for changes in the load in the vehicle.

To control the necessary flow of fluid to and from the alternative load distribution unit 140, an additional load distribution unit position sensor (not shown) is required to enable the position of each piston 128 to be ascertained. In order to achieve the correct positioning of said pistons, the ECU averages the load distribution unit piston position sensor signals to attain the desired initial spacing between the pistons 128 by supplying or releasing fluid from the outer chambers 160. This extra function is incorporated into the control loop for the other load distribution units as described earlier. All the other functions remain identical.

Figure 5:
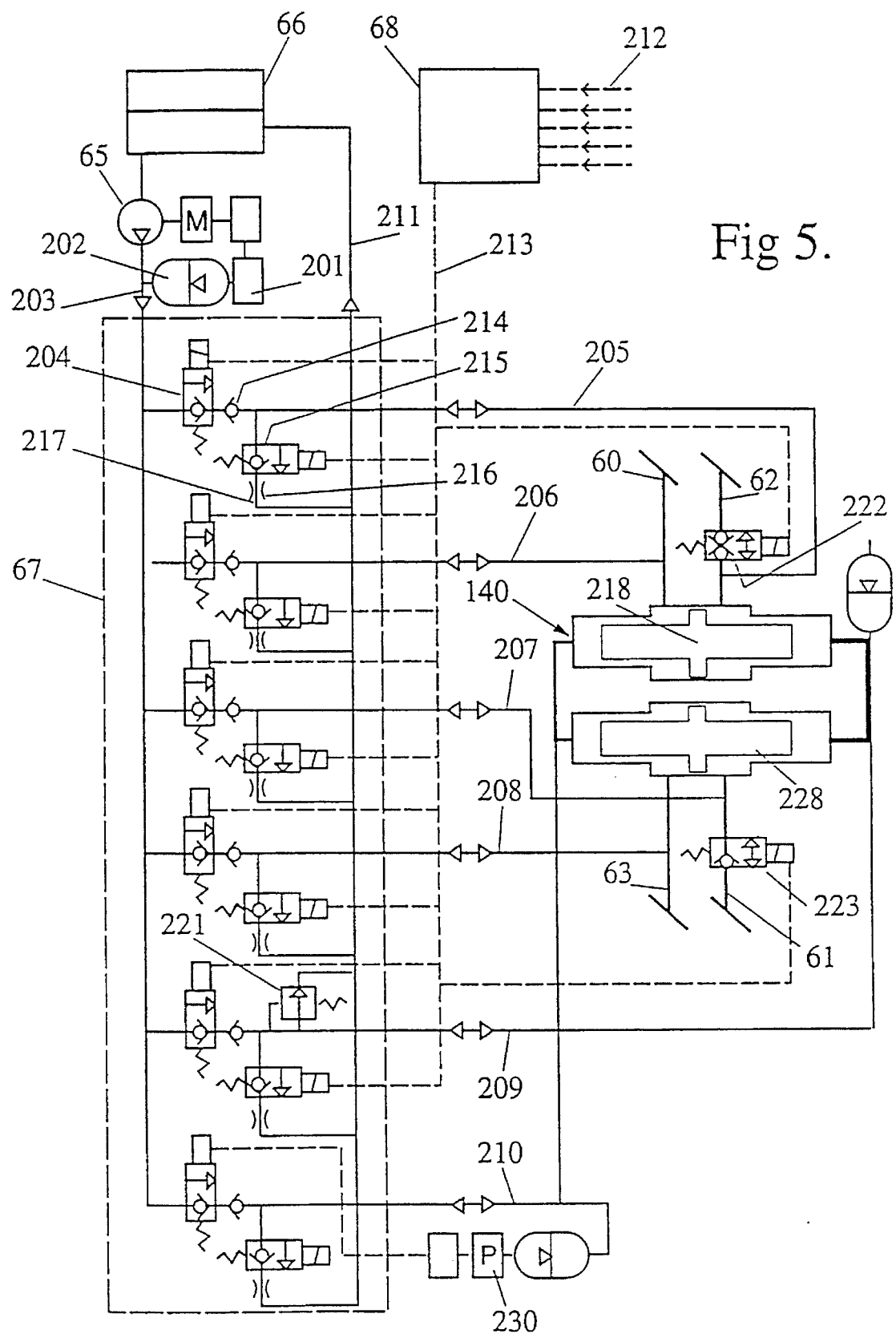
FIG. 5 is a schematic diagram showing further details of the control system.

FIG. 5 is a schematic diagram showing further details of the control system for use in the above mentioned suspension system. Fluid is stored in the fluid reservoir 66. The pump 65, pressure transducer 201 and accumulator 202 are adapted to maintain a constant pressure in fluid supply line 203 independent of the flow requirements in the following system.

The bank of valves or control manifold 67 contains a number of valves 204 for controlling the flow of fluid through the control lines 205, 206, 207, 208, 209, and 210 to the load distribution unit 140. Fluid is supplied from the reservoir 66 through supply line 203 and is returned to the reservoir 66 through drain line 211. The control lines 205, 206, 207 and 208 are respectively connected to the branch conduits 62,60,61 and 63 extending from the fluid circuits. Control lines 209 and 210 are connected to the outer chambers 160 of the load distribution unit 140.

The ECU 68 receives inputs 212 relating to various parameters including wheel cylinder extensions, load distribution device piston positions, ignition switch position, speed, acceleration values, desired height set point, auto/manual and manual attitude joystick positions. The resulting outputs 213 control the valves within the control manifold 67.

Each manifold valve 204 is controlled by the ECU 68 to supply fluid to the respective control line. A check valve 214 prevents each valve 204 passing fluid back to the pump 65 when the pressure in the supply line 203 is below the pressure in respective control line, which can arise, for example, when the vehicle hits a large bump. A further valve 215 controlled by the ECU 68 allows fluid to be drained through branch drain lines 217 from respective control lines to the drain line 211. A restrictor 216 is provided on each branch drain line 217 to limit the rate the drainage of fluid to about the same as the rate that fluid is supplied by the pump 65 to the respective control line. This provides for smoother control. The same arrangement is provided for each of the control lines 205, 206, 207 and 208. Another ECU and a pressure transducer 230 provides the control for the valves 204 and 215 connected to control line 210. This control loop ensures that pressure is regulated in one outer chamber 160 of the load distribution unit 140. Control line 209, in conjunction with the above pressure regulating circuit, adjusts the positioning of the load distribution unit pistons 128. A pressure relief valve 221 is incorporated into this circuit to prevent accidental overpressurising of the circuit due to improper operation when the ECU 68 is disconnected, for example when the vehicle is being serviced.

Lockout valves 222 and 223 are controlled by the ECU 68 to isolate the toad distribution unit 140 when required to prevent movement in response to Inputs to the ECU 68 relating to, for example the speed and acceleration of the vehicle. This can change for example the vehicle's handling under certain situations.

We claim:

1. A vehicle suspension system for a vehicle body supported by a plurality of wheels arranged in lateral and longitudinal spaced relation to the vehicle body, including individual fluid ram means arranged between each wheel and the vehicle body, each fluid ram means including a double acting ram having an upper and lower chamber, conduit means individually communicating the upper chamber of the respective rams with the lower chamber of the respective diagonally opposite ram to provide fluid circuits therebetween, a load distribution means operably interposed between the fluid circuits and adapted to at least substantially equalize the pressure in said fluid circuits and thereby maintain substantially consistent loading on all the wheels during non-dynamic wheel movement independent of the vertical disposition of the wheel, the load distribution means having a body supporting at least one displaceable member, the displacement of said displaceable member being a function of the average height of each pair of diagonally opposite wheels, sensor means adapted to generate a signal indicative of the positional relation of each of the wheels relative to the vehicle body, control means arranged to receive said signals and determine the average height of the vehicle body relative to selected pairs of orthogonally adjacent wheels at a selected location between the respective pair of orthogonally adjacent wheels, and adjustment means operable in response to variation of said determined average heights from a respective preset datum height for each said pair of wheels to adjust the quantity of fluid in said circuits communicating with the rams of said orthogonally adjacent wheels to establish said preset datum height between the orthogonally adjacent wheels and the vehicle body at said selected locations, wherein a further sensor means is provided for generating a signal indicative of the positional relation of the at least one displaceable member relative to the body of the load distribution means, the control means being adapted to receive the signal from the further sensor means and to determine and compare the average height of each pair of diagonally opposite wheels with the position of the displaceable member, the adjustment means adjusting the quantity of fluid in the fluid circuits to return the position of the displaceable member to an optimum position to facilitate the operation of the load distribution means.

2. The vehicle suspension system according to claim 1, wherein the control means is adapted to receive said signals from each said sensor means, and to independently compare the average height of each orthogonally adjacent wheel with the preset datum height of said two wheels in a preset sequence.

3. The vehicle suspension system according to claim 1, wherein the adjustment means is arranged to operate to individually adjust the volume of fluid in the respective fluid circuits connecting the diagonally opposite front and rear wheels to provide the required positional location of the body relative to the wheels.

4. The vehicle suspension system according to claim 2, wherein the adjustment means is arranged to operate to individually adjust the volume of fluid in the respective fluid circuits connecting the diagonally opposite front and rear wheels to provide the required positional location of the body relative to the wheels.

5. The vehicle suspension system according to claim 1, 2 or 3, wherein one of the respective sensor means is provided to sense the position of each wheel relative to the vehicle body and provide an input to the control means indicative of that positional relationship.

6. The vehicle suspension system according to claim 1, 2 or 3, wherein the preset datum height is adjustable.

7. The vehicle suspension system according to claim 1, 2 or 3, wherein the body of the load distribution means includes at least two chambers, each chamber supporting one of said at least one displaceable members in the form of a piston rod carrying a piston separating the chamber into inner and outer minor chambers, the minor chambers being in fluid communication with opposing said fluid circuits, whereby any pressure differential between the fluid in the minor chambers results in displacement of the piston rod.

8. The vehicle suspension system according to claim 7, wherein the body of the load distribution means includes at least two chambers, each chamber supporting one of said at least one displaceable members in the form of a piston rod carrying a piston separating the chamber into inner and outer minor chambers, the minor chambers being in fluid communication with opposing said fluid circuits, whereby any pressure differential between the fluid in the minor chambers results in displacement of the piston rod.

9. The vehicle suspension system according to claim 7, wherein the piston rods of each chamber are operably interconnected to transfer force therebetween.

10. The vehicle suspension system according to claim 8, wherein the piston rods of each chamber are operably interconnected to transfer force therebetween.

11. The vehicle suspension system according to claim 7, wherein the piston rods are separately movable, a separate said further sensor means is provided for each said piston rod to enable the control means to determine the relative position of each piston rod, the outer minor chambers of each chamber being in fluid communication to enable the adjustment means to adjust the fluid within each said outer minor chamber to thereby control the relative position of the piston rods.

12. The vehicle suspension system according to claim 1, 2, 3, or 4, wherein the adjustment means includes pump means and valve means controlled by the control means for supplying or withdrawing fluid from selected fluid circuits to effect the necessary adjustment to the position of the wheels relative to the vehicle body to achieve the necessary correct average height corresponding to the relative datum height.

13. The vehicle suspension system according to claim 5, wherein the adjustment means includes pump means and valve means controlled by the control means for supplying or withdrawing fluid from selected fluid circuits to effect the necessary adjustment to the position of the wheels relative to the vehicle body to achieve the necessary correct average height corresponding to the relative datum height.

14. The vehicle suspension system according to claim 1, 2 or 3, further comprising at least one accumulator in each fluid circuit.

15. The vehicle suspension system according to claim 1, 2, 3, or 4, wherein the control means includes a plurality of operational modes providing differing rates of adjustment in dependence on the variance of the vehicle from the preset datum height and the operational status of the vehicle.

16. The vehicle suspension system according to claim 1, 2 or 3, further comprising lock out valve means located in at least one of the conduit means for selectively preventing flow of fluid therethrough.

* * * * *